(12) United States Patent
Yang et al.

(10) Patent No.: US 8,469,380 B2
(45) Date of Patent: Jun. 25, 2013

(54) EXTENDING AND RETRACTING DEVICE AND VEHICLE STEP APPARATUS HAVING THE SAME

(75) Inventors: Huizhong Yang, Hang Zhou (CN); Zhaobo Qing, Hang Zhour (CN)

(73) Assignee: T-Max (Hang Zhou) Industrial Co., Ltd. (CN)

( * ) Notice: Subject to any disclaimer, the term of this patent is extended or adjusted under 35 U.S.C. 154(b) by 206 days.

(21) Appl. No.: 12/984,677

(22) Filed: Jan. 5, 2011

(65) Prior Publication Data

US 2012/0025485 A1 Feb. 2, 2012

(30) Foreign Application Priority Data

Jul. 28, 2010 (CN) .......................... 2010 1 0240397
Oct. 18, 2010 (CN) .......................... 2010 1 0515268

(51) Int. Cl.
*B60R 3/00* (2006.01)
(52) U.S. Cl.
USPC .......... 280/166; 182/88; 182/127; 248/286.1; 248/278.1; 248/281.11; 280/163; 280/164.1
(58) Field of Classification Search
USPC ................. 280/166, 163, 164.1; 182/88, 127; 248/278.1, 281.11, 286.1
See application file for complete search history.

(56) References Cited

U.S. PATENT DOCUMENTS

| | | | |
|---|---|---|---|
| 32,460 A | 6/1861 | Betts | |
| 115,664 A | 6/1871 | Vollhardt | |
| 125,235 A | 4/1872 | Wells | |
| 752,031 A | 2/1904 | Chadwick | |
| 1,052,364 A | 2/1913 | Morris | |
| 1,146,559 A | 7/1915 | Fuller | |
| 1,182,563 A | 5/1916 | Hild et al. | |
| 1,487,408 A | 3/1924 | Tichy et al. | |

(Continued)

FOREIGN PATENT DOCUMENTS

| | | |
|---|---|---|
| CA | 2438489 A1 | 10/2002 |
| CA | 2463717 A1 | 5/2003 |

(Continued)

OTHER PUBLICATIONS

Mar. 30, 2009 Requirement for Election/Restriction for U.S. Appl. No. 11/973,444.

(Continued)

*Primary Examiner* — J. Allen Shriver, II
*Assistant Examiner* — Hilary L Johns
(74) *Attorney, Agent, or Firm* — Bliss McGlynn, P.C.

(57) ABSTRACT

An extending and retracting device for a vehicle-step apparatus includes a mounting bracket and step bracket. A first arm defines a first end pivotally connected to the mounting bracket and a second end pivotally connected to the step bracket. A second arm defines a first end pivotally connected to the mounting bracket and a second end. A third arm defines a first end pivotally connected to the second end of the second arm and a second end pivotally connected to the step bracket. A trajectory-control assembly is configured to connect the first arm to the second arm and/or third arm to control a "motion" trajectory of the step bracket. A vehicle-step apparatus includes a step member, the extending and retracting device, and a driving device driving the first arm and/or second arm to move the extending and retracting device between an extended position and a retracted position.

20 Claims, 7 Drawing Sheets

U.S. PATENT DOCUMENTS

| | | | |
|---|---|---|---|
| 2,118,557 | A | 5/1938 | Hamilton |
| 2,423,961 | A | 7/1947 | Buxton |
| 2,764,422 | A | 9/1956 | McDonald |
| 3,494,634 | A | 2/1970 | Paula |
| 3,528,574 | A | 9/1970 | Denner et al. |
| 3,833,240 | A | 9/1974 | Weiler |
| 3,887,217 | A | 6/1975 | Thomas |
| 3,955,827 | A | 5/1976 | Wonigar |
| 4,073,502 | A | 2/1978 | Frank et al. |
| 4,110,673 | A | 8/1978 | Nagy et al. |
| 4,116,457 | A | 9/1978 | Nerem et al. |
| 4,982,974 | A | 1/1991 | Guidry |
| 5,538,269 | A | 7/1996 | McDaniel et al. |
| 5,842,709 | A | 12/1998 | Maccabee |
| 6,027,090 | A * | 2/2000 | Liu .................... 248/281.11 |
| 6,641,158 | B2 | 11/2003 | Leitner |
| 6,830,257 | B2 | 12/2004 | Leitner |
| 6,834,875 | B2 | 12/2004 | Leitner et al. |
| 6,926,295 | B2 | 8/2005 | Berkebile et al. |
| 6,938,909 | B2 | 9/2005 | Leitner |
| 6,942,233 | B2 | 9/2005 | Leitner et al. |
| 7,007,961 | B2 | 3/2006 | Leitner et al. |
| 7,055,839 | B2 | 6/2006 | Leitner |
| 7,118,120 | B2 | 10/2006 | Lee et al. |
| 7,163,221 | B2 | 1/2007 | Leitner |
| 7,287,771 | B2 | 10/2007 | Lee et al. |
| 7,367,574 | B2 | 5/2008 | Leitner |
| 7,380,807 | B2 | 6/2008 | Leitner |
| 7,398,985 | B2 | 7/2008 | Leitner et al. |
| 7,413,204 | B2 | 8/2008 | Leitner |
| 7,441,790 | B2 * | 10/2008 | Lechkun ...................... 280/166 |
| 7,487,986 | B2 | 2/2009 | Leitner et al. |
| 7,566,064 | B2 | 7/2009 | Leitner et al. |
| 7,584,975 | B2 | 9/2009 | Leitner |
| 7,621,546 | B2 | 11/2009 | Ross et al. |
| 7,712,755 | B2 * | 5/2010 | Yang et al. ...................... 280/163 |
| 7,740,260 | B2 | 6/2010 | VanBelle et al. |
| 7,740,261 | B2 | 6/2010 | Leitner et al. |
| 7,744,106 | B2 | 6/2010 | VanBelle et al. |
| 2002/0113400 | A1 | 8/2002 | Leitner |
| 2003/0184040 | A1 | 10/2003 | Leitner et al. |
| 2004/0084868 | A1 | 5/2004 | Leitner et al. |
| 2004/0124601 | A1 | 7/2004 | Leitner |
| 2005/0077697 | A1 | 4/2005 | Leitner |
| 2005/0087951 | A1 | 4/2005 | Leitner et al. |
| 2005/0104318 | A1 | 5/2005 | Lee et al. |
| 2005/0151340 | A1 | 7/2005 | Leitner |
| 2005/0179227 | A1 | 8/2005 | Leitner |
| 2005/0280242 | A1 | 12/2005 | Fabiano et al. |
| 2006/0091638 | A1 | 5/2006 | Leitner et al. |
| 2006/0125204 | A1 | 6/2006 | Leitner et al. |
| 2006/0202441 | A1 | 9/2006 | Leitner |
| 2007/0108720 | A1 | 5/2007 | Leitner |
| 2007/0278760 | A1 | 12/2007 | VanBelle et al. |
| 2008/0054586 | A1 | 3/2008 | Lechkun |
| 2008/0100024 | A1 | 5/2008 | Leitner et al. |
| 2008/0100025 | A1 | 5/2008 | Leitner et al. |
| 2008/0116653 | A1 | 5/2008 | Piotrowski |
| 2008/0191445 | A1 | 8/2008 | Yang et al. |
| 2008/0271936 | A1 | 11/2008 | Kuntze et al. |
| 2008/0290626 | A1 | 11/2008 | Leitner |
| 2009/0072508 | A1 | 3/2009 | Leitner et al. |
| 2009/0250896 | A1 | 10/2009 | Watson |
| 2009/0295114 | A1 * | 12/2009 | Yang et al. ...................... 280/166 |
| 2010/0059962 | A1 | 3/2010 | Leitner et al. |

FOREIGN PATENT DOCUMENTS

| | | |
|---|---|---|
| CA | 2475492 A1 | 1/2005 |
| CN | 1652955 A | 8/2005 |
| CN | 101020434 A | 8/2007 |
| CN | 101497325 A | 8/2009 |
| JP | 8132967 | 5/1996 |
| WO | 02085670 A2 | 10/2002 |
| WO | 03039910 A1 | 5/2003 |

OTHER PUBLICATIONS

Apr. 28, 2009 Response to Requirement for Election/Restriction for U.S. Appl. No. 11/973,444.
Jun. 1, 2009 Office Action for U.S. Appl. No. 11/973,444.
Jul. 7, 2009 Amendment for U.S. Appl. No. 11/973,444.
Oct. 21, 2009 Final Office Action for U.S. Appl. No. 11/973,444.
Jan. 12, 2010 Amendment After Final Rejection Pursuant to 37 C.F.R. 1.116 for U.S. Appl. No. 11/973,444.
Jan. 26, 2010 Notice of Allowance and Fee(s) Due for U.S. Appl. No. 11/973,444.

* cited by examiner

Fig. 14

EXTENDING AND RETRACTING DEVICE AND VEHICLE STEP APPARATUS HAVING THE SAME

CROSS-REFERENCE TO RELATED APPLICATION(S)

This application claims priority to and benefit of the filing date of Chinese Patent Application 201010240397.3 filed on Jul. 28, 2010 and Chinese Patent Application 201010515268.0 filed on Oct. 18, 2010.

BACKGROUND OF INVENTION

1. Field of Invention

The invention relates, generally, to an extending and retracting device and, particularly, to a vehicle-step apparatus having the extending and retracting device.

2. Description of Related Art

The vehicle-step apparatus under a door of a vehicle is used for a passenger to get into or out of the vehicle. U.S. Pat. No. 6,830,257 discloses a retractable vehicle-step apparatus employing a four-link mechanism. When the vehicle door is opened, the step member of the vehicle-step apparatus is automatically extended out downwardly from its retracted position under the chassis of the vehicle so that a passenger can step on the extended vehicle-step apparatus. When the vehicle door is closed, the step member is automatically retracted upwardly to its original position.

The step bracket of the vehicle-step apparatus of the related art employing the four-link mechanism is short in travel, the "motion" trajectory of the step member mounted on the step bracket is difficult to control, and the travel of the step member is restricted. Therefore, the vehicle-step apparatus must be mounted at a position on the chassis of the vehicle near the edge of the vehicle door (thus, limiting the mounting of the vehicle-step apparatus), and the vehicle-step apparatus may interfere with the ground and chassis of the vehicle.

Thus, there is a need in the related art for a vehicle-step apparatus the step bracket of which is not short in travel, the "motion" trajectory of the step member mounted on the step bracket is not difficult to control, and the travel of the step member is not restricted. More specifically, there is a need in the related art for such a vehicle-step apparatus that must not be mounted at a position on the chassis of the vehicle near the edge of the vehicle door, mounting of which is not limited, and that may not interfere with the ground and chassis of the vehicle.

SUMMARY OF INVENTION

The invention overcomes the disadvantages in the related art in an extending and retracting device for a vehicle-step apparatus. The device includes a mounting bracket and step bracket. A first arm defines a first end pivotally connected to the mounting bracket and a second end pivotally connected to the step bracket. A second arm defines a first end pivotally connected to the mounting bracket and a second end. A third arm defines a first end pivotally connected to the second end of the second arm and a second end pivotally connected to the step bracket. A trajectory-control assembly is configured to connect the first arm to the second arm and/or third arm to control a "motion" trajectory of the step bracket. The invention overcomes the disadvantages in the related art also in a vehicle-step apparatus that includes a step member, the extending and retracting device, and a driving device driving the first arm and/or second arm to move the extending and retracting device between an extended position and a retracted position.

One advantage of the extending and retracting device for a vehicle-step apparatus of the invention is that the "motion" trajectory of the step bracket may be conveniently controlled with high precision.

Another advantage of the extending and retracting device of the invention is that the travel of the step bracket may be long so that the extending and retracting device may be mounted at different positions on the chassis of the vehicle, thus improving applicability of the extending and retracting device.

Another advantage of the extending and retracting device of the invention is that the travel of the step bracket may be lengthened so that the extending and retracting device may be mounted to a middle portion on the bottom of the chassis of the vehicle.

Another advantage of the extending and retracting device of the invention is that the distance between it and the ground is large so that the extending and retracting device does not interfere with the ground.

Another advantage of the extending and retracting device of the invention is that the step bracket may avoid interfering with an edge of the chassis of the vehicle near the vehicle door.

Another advantage of the extending and retracting device of the invention is that it may be mounted at different positions on the chassis.

Another advantage of the extending and retracting device of the invention is that it may not interfere with the chassis of the vehicle and ground.

Another advantage of the extending and retracting device of the invention is that it may be suitable for different types of vehicles and various chassis of the vehicle, thus improving applicability of the extending and retracting device.

One advantage of the vehicle-step apparatus of the invention is that the motion trajectory of the step member may be conveniently controlled with high precision.

Another advantage of the vehicle-step apparatus of the invention is that the travel of the step member may be long so that the extending and retracting device may be mounted onto a middle portion of the chassis of the vehicle and not interfere with the ground.

Another advantage of the vehicle-step apparatus of the invention is that the step member may not interfere with an edge of the chassis of the vehicle near the vehicle door.

Another advantage of the vehicle-step apparatus of the invention is that the extending and retracting device may be mounted at different positions to make full use of the space under the chassis.

Another advantage of the vehicle-step apparatus of the invention is that the extending and retracting device may not interfere with the ground and chassis of the vehicle.

Another advantage of the vehicle-step apparatus of the invention is that the extending and retracting device may meet the requirements of different types of vehicles and be applicable for various chassis of the vehicle, thus improving applicability of the extending and retracting device.

Other objects, features, and advantages of the extending and retracting device and vehicle-step apparatus of the invention are readily appreciated as the same becomes better understood while reading the subsequent detailed description of embodiment(s) of the invention taken in conjunction with the figures of the accompanying drawing thereof.

DETAILED DESCRIPTION OF EMBODIMENT(S) OF INVENTION

As shown in FIGS. 1 through 14, throughout which like numerals indicate like structure, an extending and retracting device for a vehicle-step apparatus according to embodiments of the invention includes, in general, a mounting bracket 3, a step bracket 11, a first arm 4, a second arm 2, a third arm 6, and a trajectory-control assembly.

The mounting bracket 3 is mounted onto a chassis "F" of a vehicle, and the step bracket 11 is configured to mount a step member 12 thereon. A first end of the first arm 4 is pivotally connected to the mounting bracket 3, and a second end thereof is pivotally connected to the step bracket 11. A first end of the second arm 2 is pivotally connected to the mounting bracket 3. A first end of the third arm 6 is pivotally connected to the second end of the second arm 2, and a second end of the third arm 6 is pivotally connected to the step bracket 11.

The trajectory-control assembly connects the first arm 4 to at least one of the second arm 2 and third arm 6. In other words, the trajectory-control assembly may be connected between the first arm 4 and second arm 2, between the first arm 4 and third arm 6, or between the first arm 4 and both the second arm 2 and third arm 6. The trajectory-control assembly is configured to control a "motion" trajectory of the step bracket 11 to control a "motion" trajectory of the step member 12. Therefore, the "motion" trajectory of the step bracket 11 and step member 12 may be conveniently controlled with high precision, and the travel of the step bracket 11 and step member 12 is long so that the extending and retracting device may be mounted at different positions on the chassis of the vehicle (such as the middle of the chassis) and not interfere with the ground and chassis of the vehicle, thus improving applicability thereof.

The extending and retracting device for a vehicle-step apparatus according to a first embodiment of the invention is described below with reference to FIGS. 1 through 3. In the first embodiment, the trajectory-control assembly includes a trajectory-control plate 8a and trajectory-control rod 14.

The trajectory-control plate 8a is mounted onto one of the first, second, and third arms 4, 2, 6 and formed with a trajectory-control groove 81 therein. A first end of the trajectory-control rod 14 is inserted into and movable in the trajectory-control groove 81. A second end of the trajectory-control rod 14 is mounted onto an arm opposite to the one of the first, second, and third arms 4, 2, 6 onto which the trajectory-control plate 8a is mounted in a substantially transverse direction (i.e., the substantial left-right direction as viewed in FIG. 1).

Figure 1:
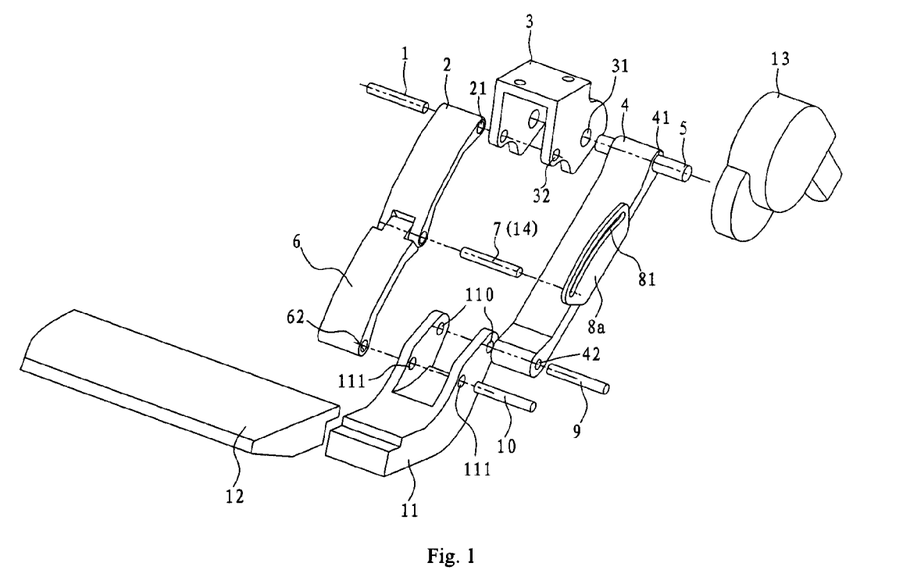
FIG. 1 is a perspective view of a vehicle-step apparatus according to a first embodiment of the invention.
Figure 2:
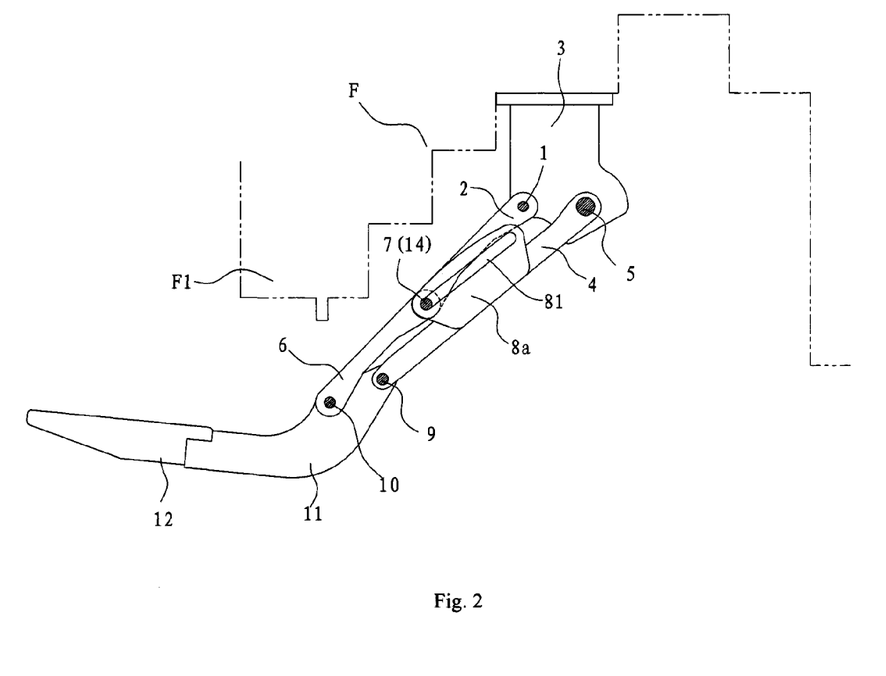
FIG. 2 is a schematic view of the vehicle-step apparatus shown in FIG. 1 mounted under a chassis of a vehicle and in which the extending and retracting device of the vehicle-step apparatus is in an extended position.
Figure 3:
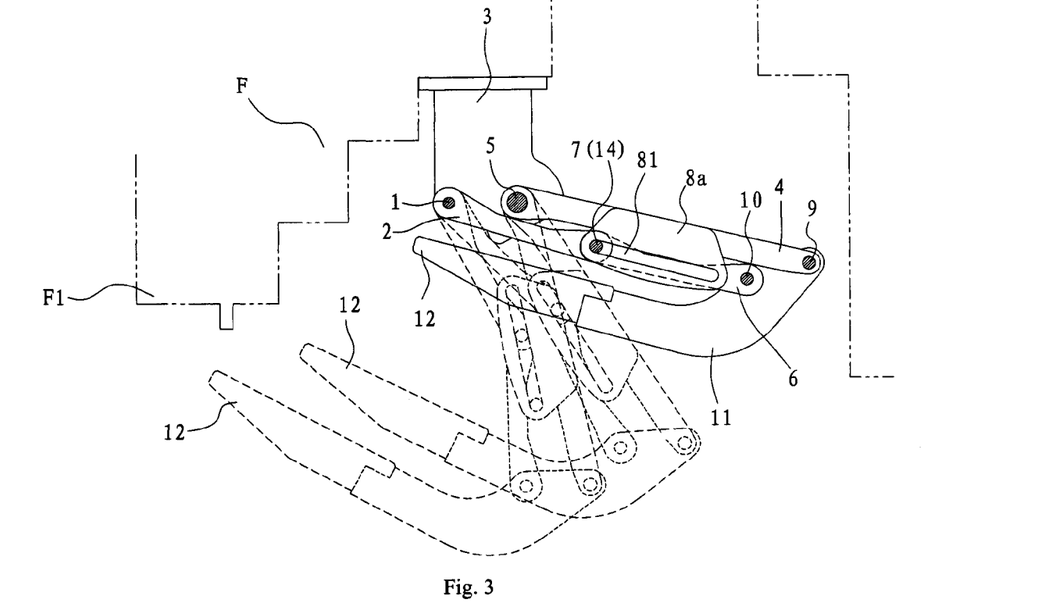
FIG. 3 is a schematic view of the vehicle-step apparatus shown in FIG. 1 mounted under a chassis of a vehicle and in which the extending and retracting device of the vehicle-step apparatus is moved from the extended position to a retracted position.

As shown in FIGS. 1 through 3, in embodiments of the invention, a first end of the first arm 4 in a substantially longitudinal direction (i.e., the substantially longitudinal direction of the first arm 4) is pivotally connected to the mounting bracket 3, and a second end thereof is pivotally connected to the step bracket 11. A first end of the second arm 2 is pivotally connected to the mounting bracket 3. A first end of the third arm 6 is pivotally connected to the second end of the second arm 2 via an intermediate pivot 7, and a second end of the third arm 6 is pivotally connected to the step bracket 11.

The trajectory-control plate 8a is mounted onto the first arm 4. A first end of the trajectory-control rod 14 is inserted into and movable in the trajectory-control groove 81. A second end of the trajectory-control rod 14 is mounted onto an arm opposite to the first arm 4 in a substantially transverse direction. More particularly, in the embodiment shown in FIGS. 1 through 3, the second end of the trajectory-control rod 14 is mounted onto both the second arm 2 and third arm 6—that is, the second end of the trajectory-control rod 14 is connected to the second arm 2 and third arm 6 simultaneously.

In embodiments of the invention, as shown in FIGS. 1 through 3, the first end (i.e., the upper end as viewed in FIG. 1) of the first arm 4 is pivotally connected to the mounting bracket 3 via a pivot 5, and the second end (i.e., the lower end as viewed in FIG. 1) thereof is pivotally connected to the step bracket 11 via a pivot 9. More particularly, the pivot 5 passes through a hole 41 formed in the first end of the first arm 4 and a hole 31 formed in the mounting bracket 3 to pivotally connect the mounting bracket 3 and upper end of the first arm 4. The pivot 9 passes through a hole 42 in the second end of the first arm 4 and a hole 110 formed in the step bracket 11 to pivotally connect the step bracket 11 and second end of the first arm 4.

The first end (i.e., the upper end as viewed in FIG. 1) of the second arm 2 is pivotally connected to the mounting bracket 3 via a pivot 1, and the second end (i.e., the lower end as viewed in FIG. 1) thereof is pivotally connected to the first end (i.e., the upper end as viewed in FIG. 1) of the third arm 6 via the intermediate pivot 7.

More particularly, the pivot 1 passes through a hole 21 formed in the first end of the second arm 2 and a hole 32 formed in the mounting bracket 3 to pivotally connect the mounting bracket 3 and first end of the second arm 2. The intermediate pivot 7 passes through a hole formed in the second end of the second arm 2 and a hole formed in the first end of the third arm 6 to pivotally connect the second arm 2 and third arm 6.

The second end of the third arm 6 is pivotally connected to the step bracket 11 via a pivot 10. More particularly, the pivot 10 passes through a hole 62 formed in the second end of the third arm 6 and holes 111 formed in the step bracket 11 to pivotally connect the step bracket 11 and second end of the third arm 6.

Figure 4:
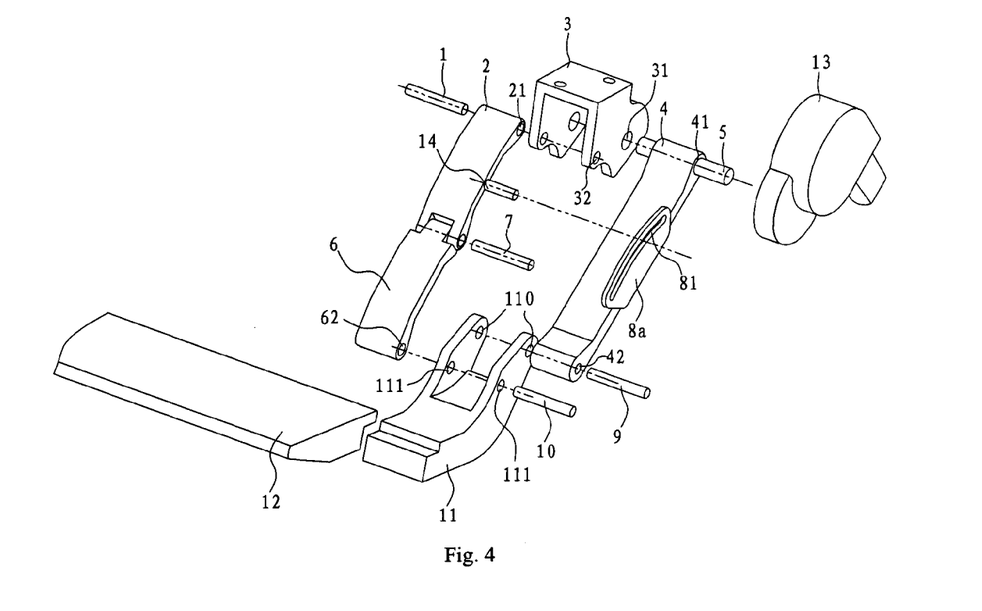
FIG. 4 is a perspective view of a vehicle-step apparatus according to a second embodiment of the invention.
Figure 6:
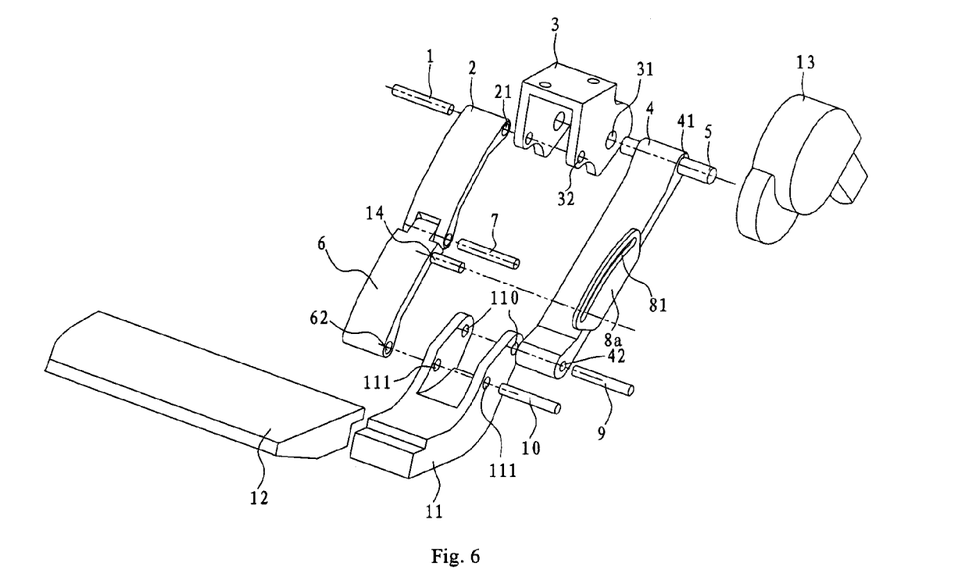
FIG. 6 is a perspective view of a vehicle-step apparatus according to a third embodiment of the invention.

In the first embodiment as shown in FIGS. 1 through 3, the intermediate pivot 7 connecting the second end of the second arm 2 and first end of the third arm 6 is also used as the trajectory-control rod 14. In other words, the trajectory-control rod 14 and intermediate pivot 7 are the same member. A first end of the intermediate pivot 7 is inserted into and movable in the trajectory-control groove 81. A second end of the intermediate pivot 7 passes through the holes formed in the second end of the second arm 2 and first end of the third arm 6 to pivotally connect the second end of the second arm 2 and first end of the third arm 6. However, it should be appreciated by those having ordinary skill in the related art that the invention is not limited to this—for example, the trajectory-control rod 14 may be a separated member and mounted onto the second arm 2 (as shown in FIG. 4) or third arm 6 (as shown in FIG. 6), which is described below.

When the trajectory-control plate 8a is mounted onto the first arm 4, the first end of the trajectory-control rod 14 may be movably inserted into the trajectory-control groove 81 of the trajectory-control plate 8a, and the second end of the trajectory-control rod 14 may be mounted onto the second arm 2 and third arm 6. As shown in FIGS. 1 through 3, because the trajectory-control rod 14 and intermediate pivot 7 are the same member, the second end of the intermediate pivot 7 pivotally connects the second arm 2 and third arm 6—that is, the second end of the intermediate pivot 7 is mounted onto both the second arm 2 and third arm 6.

As shown in FIGS. 1 through 3, the trajectory-control groove 81 is a closed-curve groove formed in the trajectory-control plate 8a. In embodiments of the invention, the trajectory-control plate 8a is connected integrally with the first arm 4—for example, the trajectory-control plate 8a may be welded onto the first arm 4 or be a part of the first arm 4. Alternatively, the trajectory-control plate 8a may be mounted onto the first arm 4 via bolts. In the embodiments shown in FIGS. 1 through 3, the trajectory-control plate 8a is configured in the form of a plate. However, it should be appreciated by those having ordinary skill in the related art that the trajectory-control plate 8a is not limited to the plate, and the trajectory-control plate 8a may be configured in other forms as long as the trajectory-control groove 81 for receiving the second end of the trajectory-control rod 4 is formed therein.

With the extending and retracting device for a vehicle-step apparatus according to the first embodiment, by using the trajectory-control groove 81 and trajectory-control rod 14 inserted therein, the "motion" trajectory of the step bracket 11 may be controlled to control the "motion" trajectory of the step member 12 mounted thereon, and the travel of the step bracket 11 may be increased. By changing the position and/or shape of the trajectory-control groove 81 and/or position of the trajectory-control rod 14, the "motion" trajectory of the step bracket 11 may be conveniently controlled with high precision so that the extending and retracting device may be mounted at different positions (such as the middle of the chassis of the vehicle), thus improving applicability of the extending and retracting device.

As shown in FIGS. 2 through 3, when the vehicle-step apparatus having the extending and retracting device is mounted onto a vehicle, by using the trajectory-control groove 81 in the trajectory-control plate 8a and trajectory-control rod 14 inserted therein, the "motion" trajectory of the step member 12 may be easily controlled. Therefore, the "motion" trajectory of the step bracket 11 and step member 12 may be conveniently controlled with high precision, the travels of the step bracket 11 and step member 12 are long so that the extending and retracting device may be mounted at the middle of the chassis "F" of the vehicle and the distance between the extending and retracting device and ground is large such that the extending and retracting device does not interfere with the ground, and the step bracket 11 and step member 12 can avoid and, thus, cannot interfere with an edge "F1" of the chassis "F" of the vehicle near the vehicle door. As shown in FIGS. 2 through 3, the distance between the edge "F1" and ground is smaller than that between the middle of the chassis "F" and ground. Accordingly, the extending and retracting device may be mounted at different positions to make full use of the space under the chassis, not interfere with the ground and chassis of the vehicle, and be suitable for different types of vehicles and various chassis of the vehicle, thus improving applicability of the extending and retracting device.

Hereinafter, the movement of the extending and retracting device is described with reference to FIGS. 2 through 3.

As shown in FIG. 2, when the vehicle door is opened, the extending and retracting device is moved to an extended position thereof so that a passenger may get into the vehicle by stepping on the step member 12. As shown in FIG. 3 (in which solid lines show a retracted position of the extending and retracting device and dashed lines show two intermediate positions between the extended and retracted positions), when the vehicle door is closed, the extending and retracting device is moved to the retracted position. It may be seen from FIGS. 2 through 3 that, with the extending and retracting device according to embodiments of the invention, the travel of the step bracket 11 is very long and "motion" trajectory of the step bracket 11 can be easily controlled by using the trajectory-control groove 81 and trajectory-control rod 14 so that the extending and retracting device may not interfere with the ground and chassis of the vehicle when moving between the extended and retracted positions.

Figure 5:
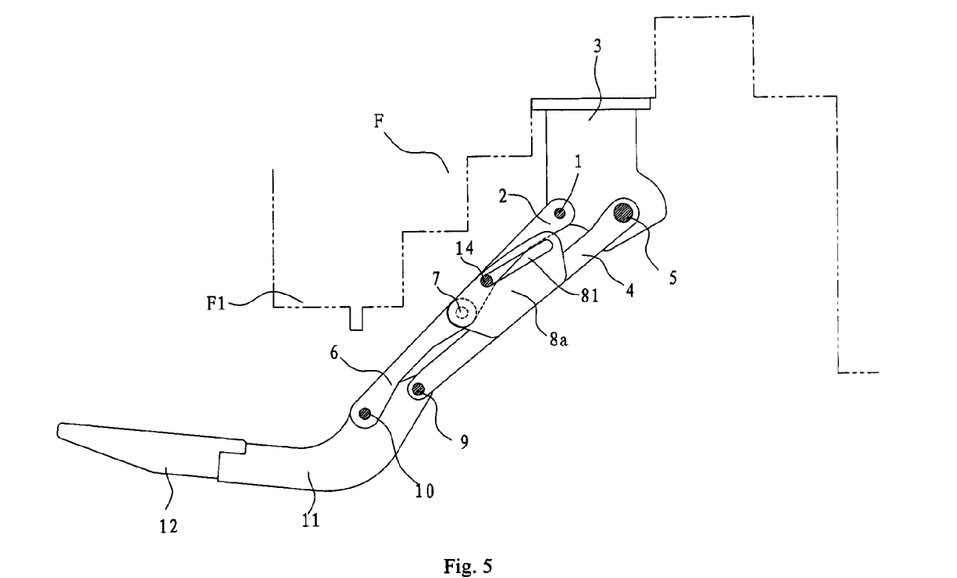
FIG. 5 is a schematic view of the vehicle-step apparatus shown in FIG. 4 mounted under a chassis of a vehicle and in which the extending and retracting device of the vehicle-step apparatus is in an extended position.

FIGS. 4 through 5 show an extending and retracting device for a vehicle-step apparatus according to a second embodiment of the invention. As shown in FIGS. 4 through 5, the second end of the trajectory-control rod 14 is mounted onto the second arm 2—for example, by welding or a bolt. Other structures and operations in the second embodiment shown in FIGS. 4 through 5 are identical with those in the first embodiment shown in FIGS. 1 through 3, and detailed descriptions thereof are omitted here. It should be appreciated by those having ordinary skill in the related art that the position and/or shape of the trajectory-control groove 81 may be adjusted accordingly to meet the requirements of "motion"-trajectory control because the position of the trajectory-control rod 14 is changed.

Figure 7:
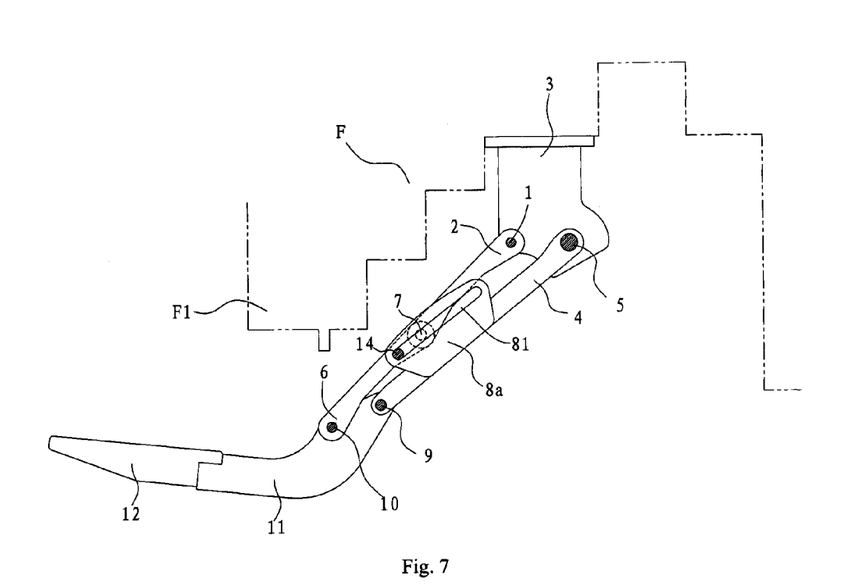
FIG. 7 is a schematic view of the vehicle-step apparatus shown in FIG. 6 mounted under a chassis of a vehicle and in which the extending and retracting device of the vehicle-step apparatus is in an extended position.

FIGS. 6 through 7 show an extending and retracting device for a vehicle-step apparatus according to a third embodiment of the invention. As shown in FIGS. 6 through 7, the second end of the trajectory-control rod 14 is mounted onto the third arm 6—for example, by welding or a bolt. Other structures and operations in the third embodiment shown in FIGS. 6 through 7 are identical with those in the first embodiment shown in FIGS. 1 through 3 or second embodiment shown in FIGS. 4 through 5, and detailed descriptions thereof are omitted here. It should be appreciated by those having ordinary skill in the related art that the position and/or shape of the trajectory-control groove 81 may be adjusted accordingly to meet the requirements of "motion"-trajectory control because the position of the trajectory-control rod 14 is changed.

It should be appreciated by those having ordinary skill in the related art that, when the trajectory-control plate 8a is mounted onto the first arm 4, the first end of the trajectory-control rod 14 may be movably inserted into the trajectory-control groove 81 and the second end of the trajectory-control rod 14 may be mounted onto an arm opposite to the first arm 4. For example, the second end of the trajectory-control rod 14 is mounted onto the second arm 2 (see FIGS. 4 through 5), third arm 6 (see FIGS. 6 through 7), or both the second arm 2 and third arm 6 (see FIGS. 1 through 3 in which the trajectory-control rod 14 and intermediate pivot 7 are the same member, thus reducing the number of the components).

In embodiments of the invention, the trajectory-control plate 8a may be mounted onto the second arm 2, and the second end of the trajectory-control rod 14 is mounted onto the first arm 4. In other embodiments, the trajectory-control plate 8a may be mounted onto the third arm 6, and the second end of the trajectory-control rod 14 is mounted onto the first arm 4. When the trajectory-control plate 8a is mounted onto the second arm 2 and/or third arm 6, the second end of the trajectory-control rod 14 is mounted onto the first arm 4.

The extending and retracting device for a vehicle-step apparatus according to a fourth embodiment of the invention is described below with reference to FIGS. 8 through 10.

Figure 8:
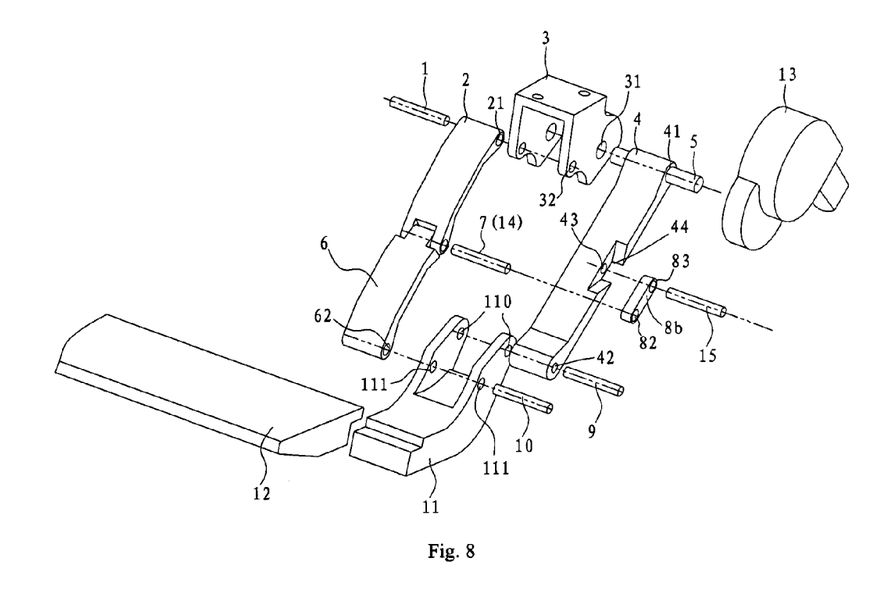
FIG. 8 is a perspective view of a vehicle-step apparatus according to a fourth embodiment of the invention.
Figure 9:
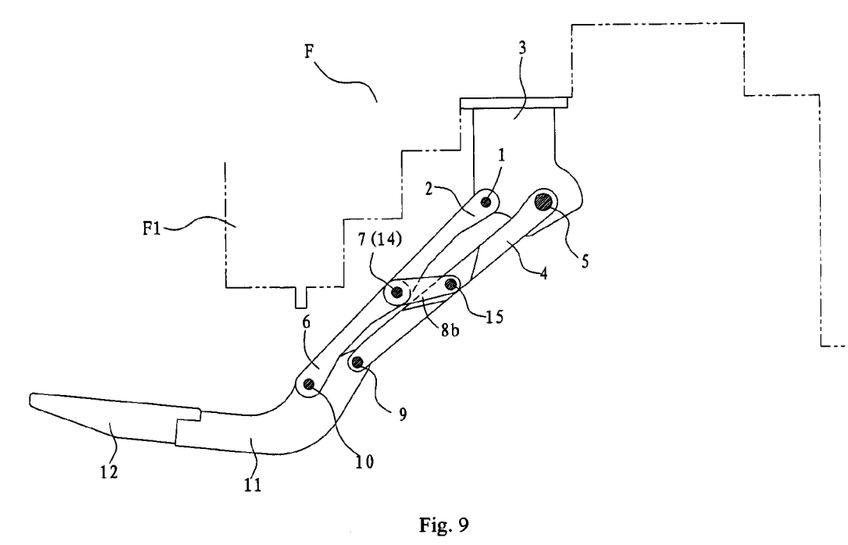
FIG. 9 is a schematic view of the vehicle-step apparatus shown in FIG. 8 mounted under a chassis of a vehicle and in which the extending and retracting device of the vehicle-step apparatus is in an extended position.
Figure 10:
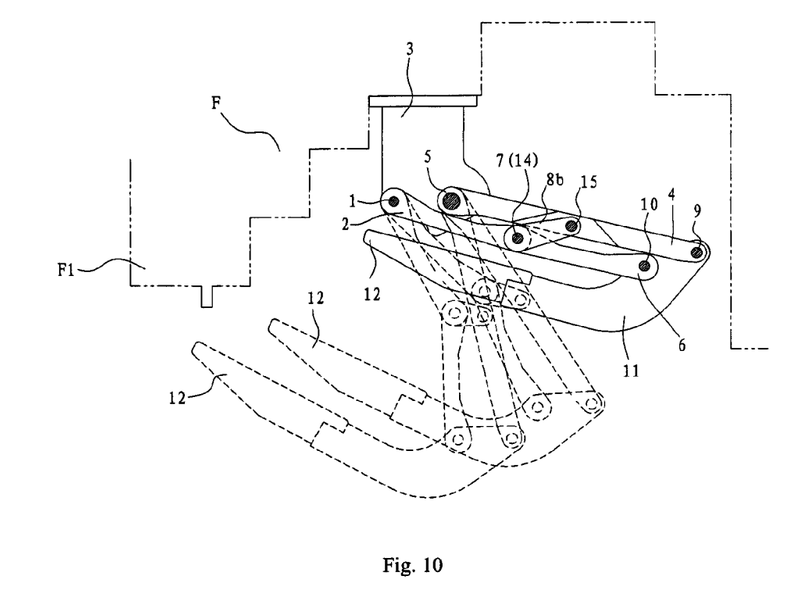
FIG. 10 is a schematic view of the vehicle-step apparatus shown in FIG. 8 mounted under a chassis of a vehicle and in which the extending and retracting device of the vehicle-step apparatus is moved from the extended position to a retracted position.

As shown in FIGS. 8 through 10, the trajectory-control assembly includes a trajectory-control lever 8b and trajectory-control rod 14. A first end of the trajectory-control lever 8b is pivotally connected to one of the first, second, and third arms 4, 2, 6. A first end of the trajectory-control rod 14 is pivotally connected to the second end (i.e., a lower end as viewed in FIG. 8) of the trajectory-control lever 8b, and a second end of the trajectory-control rod 14 is connected to an arm opposite to the one of the first, second, and third arms 4, 2, 6 in a substantially transverse direction.

In the fourth embodiment shown in FIGS. 8 through 10, the trajectory-control lever 8b is configured as a long column, and the sides thereof have a substantially oblong shape. Through-holes 82, 83 are formed respectively in both ends of the trajectory-control lever 8b. The first end of the trajectory-control lever 8b is pivotally connected to the first arm 4. The first end of the trajectory-control rod 14 is rotatably inserted into through-hole 82 in the second end of the trajectory-control lever 8b, and the second end of the trajectory-control rod 14 is connected to the second arm 2 and third arm 6. More particularly, the second arm 2 and third arm 6 are connected via the intermediate pivot 7, which is also used as the trajectory-control rod 14, so that the first end of the intermediate pivot 7 is rotatably inserted into through-hole 82 and the second end of the intermediate pivot 7 connects the second arm 2 and the third arm 6.

As shown in FIG. 8, a substantially V-shaped groove 44 is formed at a substantial transverse outside of the first arm 4. A hole 43 is formed in the V-shaped groove 44. The first end of the trajectory-control lever 8b is connected in the V-shaped groove 44 via a pivot 15 passed through through-hole 83 to insert into the hole 43. The rotation of the trajectory-control lever 8b may be facilitated by formation of the V-shaped groove 44. However, it should be appreciated by those having ordinary skill in the related art that the invention is not limited to this—for example, the first end of the trajectory-control lever 8b may be directly connected to a side of the first arm 4 via the pivot 5.

Other structures and operations of the extending and retracting device according to the fourth embodiment of the invention shown in FIGS. 8 through 10 are identical with those in the first, second, or third embodiment, and detailed descriptions thereof are omitted here.

As shown in FIG. 9, when the vehicle door is opened, the extending and retracting device is moved to the extended position thereof so that a passenger may get into the vehicle by stepping on the step member 12. As shown in FIG. 10 (in which solid lines show the retracted position of the extending and retracting device and dashed lines show two intermediate positions between the extended and retracted positions), when the vehicle door is closed, the extending and retracting device is moved to the retracted position. It may be seen from FIGS. 9 through 10 that, with the extending and retracting device for a vehicle-step apparatus according to the embodiments shown, the "motion" trajectory of the step bracket 11 and step member 12 can be conveniently controlled with high precision by using the trajectory-control assembly including the trajectory-control lever 8b and trajectory-control rod 14.

Figure 11:
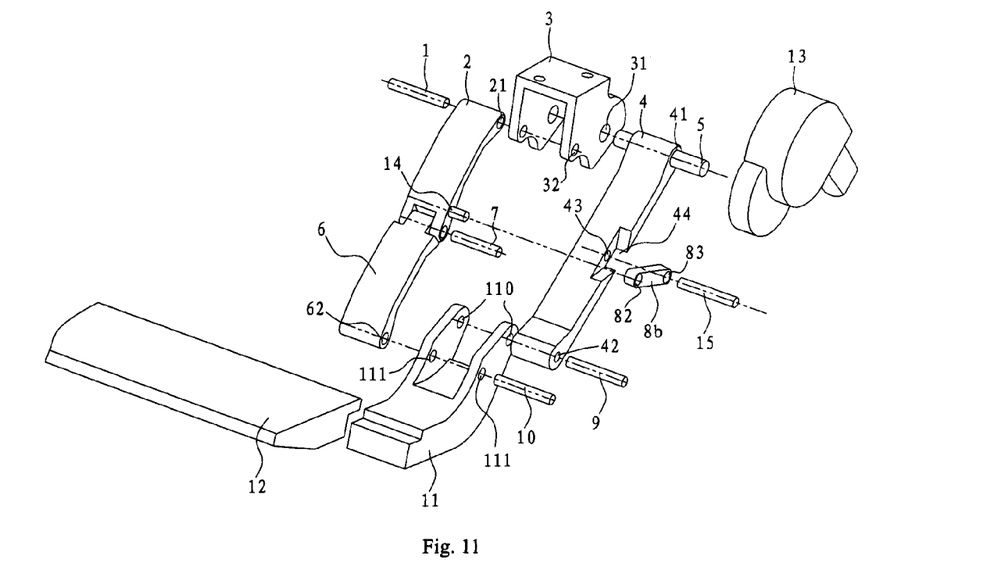
FIG. 11 is a perspective view of a vehicle-step apparatus according to a fifth embodiment of the invention.
Figure 12:
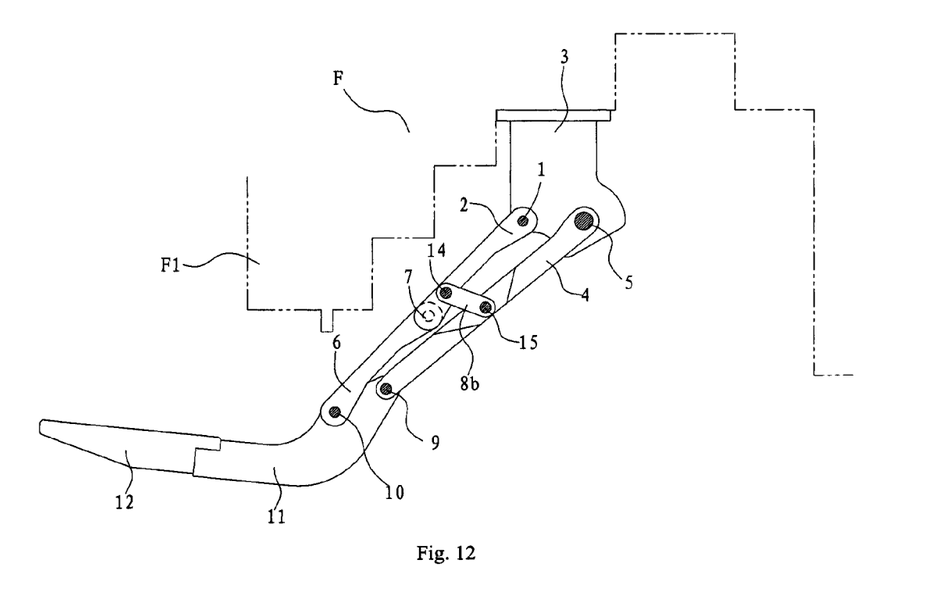
FIG. 12 is a schematic view of the vehicle-step apparatus shown in FIG. 11 mounted under a chassis of a vehicle and in which the extending and retracting device of the vehicle-step apparatus is in an extended position.

FIGS. 11 through 12 show an extending and retracting device for a vehicle-step apparatus according to a fifth embodiment of the invention. As shown in FIGS. 11 through 12, the first end of the trajectory-control lever 8b is connected to the first arm 4, and the second end of the trajectory-control rod 14 is mounted onto the second arm 2—for example, by welding or a bolt. Other structures and operations in the fifth embodiment shown in FIGS. 11 through 12 are identical with those in the fourth embodiment shown in FIGS. 8 through 10, and detailed descriptions thereof are omitted here. However, it should be appreciated by those having ordinary skill in the related art that, because the position of the trajectory-control rod 14 is changed, the connected positions of the trajectory-control lever 8b and first arm 4 (for example, the position of the hole 43 formed in the first arm 4) may be adjusted accordingly to meet the requirements of "motion"-trajectory control.

Figure 13:
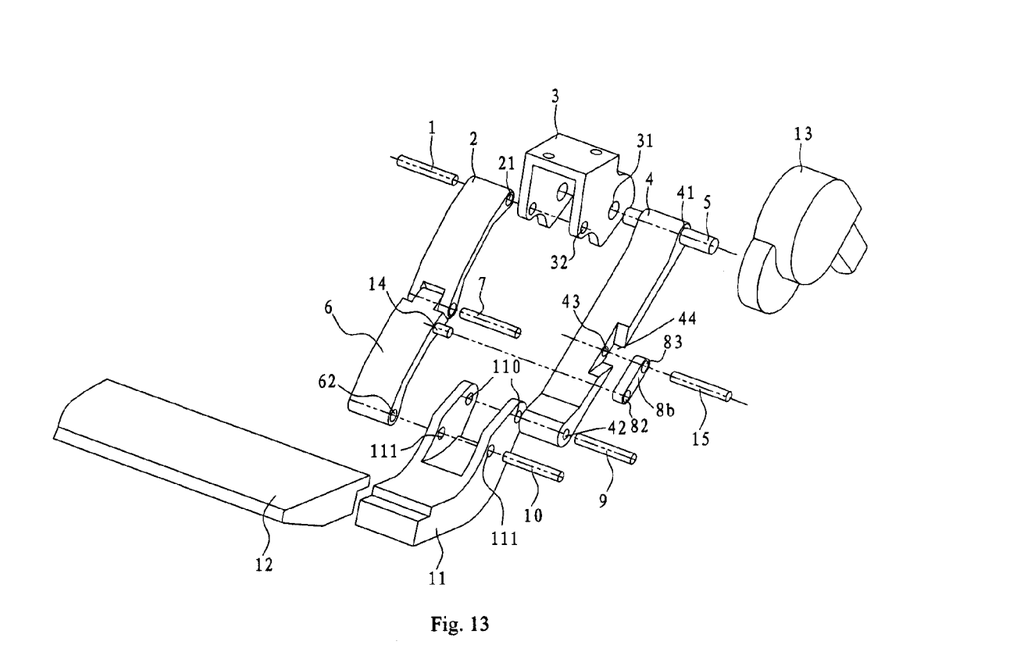
FIG. 13 is a perspective view of a vehicle-step apparatus according to a sixth embodiment of the invention.
Figure 14:
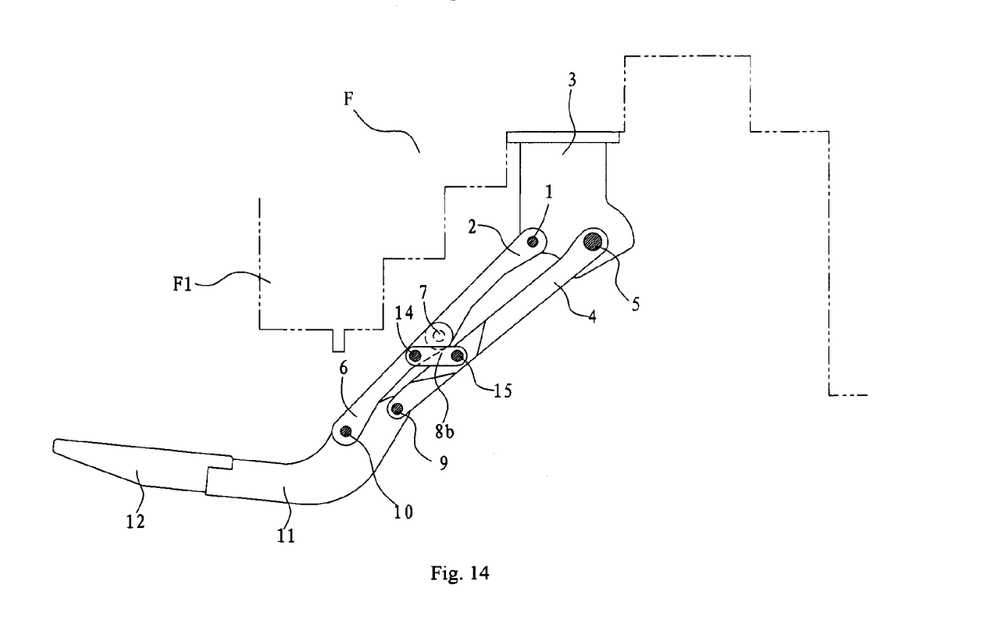
FIG. 14 is a schematic view of the vehicle-step apparatus shown in FIG. 13 mounted under a chassis of a vehicle and in which the extending and retracting device of the vehicle-step apparatus is in an extended position.

FIGS. 13 through 14 show an extending and retracting device for a vehicle-step apparatus according to a sixth embodiment of the invention. As shown in FIGS. 13 through 14, the first end of the trajectory-control lever 8b is connected to the first arm 4, and the second end of the trajectory-control rod 14 is mounted onto the third arm 6—for example, by welding or a bolt. Other structures and operations in the sixth embodiment shown in FIGS. 13 through 14 are identical with those in the fourth embodiment shown in FIGS. 8 through 10 or fifth embodiment shown in FIGS. 11 through 12, and detailed descriptions thereof are omitted here. However, it should be appreciated by those having ordinary skill in the related art that, because the position of the trajectory-control rod 14 is changed, the connected positions of the trajectory-control lever 8b and first arm 4 (for example, the position of the hole 43 formed in the first arm 4) may be adjusted accordingly to meet the requirements of "motion"-trajectory control.

In embodiments of the invention, the first end of the trajectory-control lever 8b is connected to the second arm 2 or third arm 6, and the second end of the trajectory-control rod 14 is mounted onto the first arm 4.

A vehicle-step apparatus according to an embodiment of the invention is described below with reference to the figures.

As shown in FIGS. 1 through 14, the vehicle-step apparatus according to an embodiment of the invention includes, in general, a step member 12, an extending and retracting device, and a driving device 13.

The extending and retracting device may be any of the embodiments described above. The step member 12 is mounted onto the step bracket 11. The mounting bracket 3 is mounted onto the chassis "F" of the vehicle—for example, onto the middle of the chassis "F." The driving device 13 drives the first arm 4 and/or second arm 2, such as the first arm 4 via a reducer to move the extending and retracting device between the extended and retracted positions. In one embodiment, the driving device 13 may be a motor. However, it should be appreciated by those having ordinary skill in the related art that the motor may drive the first arm 4 via the reducer.

In the embodiments shown in FIGS. 1 through 14, the vehicle-step apparatus has one extending and retracting device. However, it should be appreciated by those having ordinary skill in the related art that two extending and retracting devices may be mounted respectively onto two substantially longitudinal ends of the step member 12.

With the vehicle-step apparatus according to embodiments of the invention, the "motion" trajectory of the step member 12 can be conveniently controlled with high precision, and the travel of the step member 12 is long so that the extending and retracting device may be mounted onto the middle portion of the chassis "F" of the vehicle and distant from the ground to not interfere with the ground. And, the step member 12 may avoid and, thus, not interfere with an edge "F1" of the chassis "F" of the vehicle near the vehicle door. Therefore, the extending and retracting device may be mounted at different positions to make full use of the space under the chassis, not interfere with the ground and chassis of the vehicle, meet the requirements of different types of vehicles, and be suitable for various chassis of the vehicle, thus improving applicability of the extending and retracting device.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described and shown.

What is claimed is:

1. An extending and retracting device for a vehicle-step apparatus, said device comprising:
   a mounting bracket;
   a step bracket;
   a first arm defining a first end pivotally connected to said mounting bracket and a second end pivotally connected to said step bracket;
   a second arm defining a first end pivotally connected to said mounting bracket and a second end;
   a third arm defining a first end pivotally connected to said second end of said second arm and a second end pivotally connected to said step bracket; and
   a trajectory-control assembly configured to connect said first arm to at least one of said second and third arms to control a motion trajectory of said step bracket.

2. An extending and retracting device as set forth in claim 1, wherein said trajectory-control assembly includes a trajectory-control plate mounted onto one of said first, second, and third arms and formed with a trajectory-control groove in said trajectory-control plate and a trajectory-control rod defining a first end inserted into and movable in said trajectory-control and a second end mounted onto an arm opposite to said one of said first, second, and third arms in a substantially transverse direction.

3. An extending and retracting device as set forth in claim 2, wherein said trajectory-control plate is mounted onto either of said second and third arms and said second end of said trajectory-control rod is connected to said first arm.

4. An extending and retracting device as set forth in claim 2, wherein said trajectory-control plate is mounted onto said first arm and said second end of said trajectory-control rod is mounted onto either of said second and third arms.

5. An extending and retracting device as set forth in claim 4, wherein said trajectory-control plate is connected integrally with said first arm.

6. An extending and retracting device as set forth in claim 4, wherein said trajectory-control plate is mounted onto said first arm via a bolt.

7. An extending and retracting device as set forth in claim 2, wherein said trajectory-control plate is mounted onto said first arm and said first end of said third arm is connected to said second end of said second arm via an intermediate pivot that is also used as said trajectory-control rod.

8. An extending and retracting device as set forth in claim 2, wherein said trajectory-control groove is a closed groove formed in said trajectory-control plate.

9. An extending and retracting device as set forth in claim 1, wherein said trajectory-control assembly includes a trajectory-control lever defining a first end pivotally connected to one of said first, second, and third arms and a second end and a trajectory-control rod defining a first end pivotally connected to said second end of said trajectory-control lever and a second end connected to an arm opposite to said one of said first, second, and third arms in a substantially transverse direction.

10. An extending and retracting device as set forth in claim 9, wherein said first end of said trajectory-control lever is connected to either of said second and third arms and said second end of said trajectory-control rod is mounted onto said first arm.

11. An extending and retracting device as set forth in claim 9, wherein said first end of said trajectory-control lever is connected to said first arm and said second end of said trajectory-control rod is mounted onto either of said second and third arms.

12. An extending and retracting device as set forth in claim 11, wherein a V-shaped groove is formed at a substantially transverse outside of said first arm and said first end of said trajectory-control lever is connected in said V-shaped groove.

13. An extending and retracting device as set forth in claim 9, wherein said first end of said trajectory-control lever is connected to said first arm and said first end of said third arm is connected to said second end of said second arm via an intermediate pivot that is also used as said trajectory-control rod.

14. A vehicle-step apparatus comprising:
   a step member;
   an extending and retracting device including:
      a mounting bracket;
      a step bracket;

a first arm defining a first end pivotally connected to said mounting bracket and a second end pivotally connected to said step bracket;

a second arm defining a first end pivotally connected to said mounting bracket and a second end;

a third arm defining a first end pivotally connected to said second end of said second arm and a second end pivotally connected to said step bracket; and a trajectory-control assembly configured to connect said first arm to at least one of said second and third arms to control a motion trajectory of said step bracket; and a driving device driving at least one of said first and second arms to move said extending and retracting device between an extended position and a retracted position.

15. A vehicle-step apparatus as set forth in claim 14, wherein said driving device is a motor.

16. A vehicle-step apparatus as set forth in claim 14, wherein said trajectory-control assembly includes a trajectory-control plate mounted onto one of said first, second, and third arms and formed with a trajectory-control groove in said trajectory-control plate and a trajectory-control rod defining a first end inserted into and movable in said trajectory-control and a second end mounted onto an arm opposite to said one of said first, second, and third arms in a substantially transverse direction.

17. A vehicle-step apparatus as set forth in claim 16, wherein said trajectory-control plate is mounted onto either of said second and third arms and said second end of said trajectory-control rod is connected to said first arm.

18. A vehicle-step apparatus as set forth in claim 16, wherein said trajectory-control plate is mounted onto said first arm and said second end of said trajectory-control rod is mounted onto either of said second and third arms.

19. A vehicle-step apparatus as set forth in claim 16, wherein said trajectory-control plate is mounted onto said first arm and said first end of said third arm is connected to said second end of said second arm via an intermediate pivot that is also used as said trajectory-control rod.

20. A vehicle-step apparatus as set forth in claim 14, wherein said trajectory-control assembly includes a trajectory-control lever defining a first end pivotally connected to one of said first, second, and third arms and a second end and a trajectory-control rod defining a first end pivotally connected to said second end of said trajectory-control lever and a second end connected to an arm opposite to said one of said first, second, and third arms in a substantially transverse direction.

* * * * *